US008606650B2

(12) United States Patent
Chi et al.

(10) Patent No.: US 8,606,650 B2
(45) Date of Patent: Dec. 10, 2013

(54) METHOD AND MEDIUM FOR CROSS-CATEGORY WEDDING VENDOR RECOMMENDATIONS

(75) Inventors: Timothy Chi, Chevy Chase, MD (US); Jeff Yeh, Potomac Falls, VA (US); Lee Wang, McLean, VA (US); Sonny Ganguly, Rockville, MD (US)

(73) Assignee: WeddingWire, Inc., Rockville, MD (US)

( * ) Notice: Subject to any disclaimer, the term of this patent is extended or adjusted under 35 U.S.C. 154(b) by 646 days.

(21) Appl. No.: 11/929,035

(22) Filed: Oct. 30, 2007

(65) Prior Publication Data

US 2009/0112727 A1    Apr. 30, 2009

(51) Int. Cl.
*G06Q 30/00* (2012.01)
(52) U.S. Cl.
USPC ......................................................... 705/26.7
(58) Field of Classification Search
USPC ............................ 705/26, 27, 26.1, 26.7, 27.1
See application file for complete search history.

(56) References Cited

U.S. PATENT DOCUMENTS

| | | | |
|---|---|---|---|
| 6,609,106 B1 * | 8/2003 | Robertson | 705/5 |
| 7,302,429 B1 * | 11/2007 | Wanker | 1/1 |
| 8,214,264 B2 * | 7/2012 | Kasavin et al. | 705/26.7 |
| 2002/0082934 A1 * | 6/2002 | Koda et al. | 705/26 |
| 2002/0128934 A1 * | 9/2002 | Shaer | 705/27 |
| 2003/0093333 A1 | 5/2003 | Veeneman | |
| 2006/0235748 A1 | 10/2006 | Gordon et al. | |
| 2006/0271381 A1 | 11/2006 | Pui | |
| 2007/0073593 A1 * | 3/2007 | Perry et al. | 705/26 |

OTHER PUBLICATIONS

Mar. 2005—http://web.archive.org/web/20050324034942/http://www.entertainusa.com/.*
International Search Report from PCT/US2008/081730, mailed Apr. 30, 2009.

* cited by examiner

*Primary Examiner* — Matthew Zimmerman
(74) *Attorney, Agent, or Firm* — McDermott Will & Emery LLP

(57) ABSTRACT

Systems and methods providing a list having one or more wedding services vendors. The systems and method determine a valid set of vendors based on one or more received input data. A score for each respective vendor of the valid set of vendors is determined using the received input data and input data weighting rules. One or more recommended vendors are provided based on the determined valid set of vendors and the respective score for each respective vendor of the valid set of vendors. The one or more recommended vendors may be from the same category or from different categories of vendors. Systems and methods are also presented for managing electronic communications for wedding services by providing interfaces for enabling a vendor to present an electronic storefront related to wedding services and for a vendor to manage client leads received by the electronic storefront.

21 Claims, 14 Drawing Sheets

FIG. 11

WeddingWire
for Vendors

| Dashboard | Storefront | Leads & Clients | Marketing | Community | My Business | Analytics |

★ Get Reviews | 🔗 Refer a Vendor | 🔒 Logout
Need Help? Support
Admin User (Returns)

Leads — 1200, 1202, 1204, 1206, 1208
Leads  Clients  Availability Calendar  Lead Templates View and manage all of your WeddingWire leads here. Remember: Receiving leads is always FREE with the WeddingWire SmartMatch system.

Sort By [Newest Leads ▼] Refresh — 1224

1-100 of 220 Older > Oldest >>

| STATUS | RECEIVED | DATE/LOCATION | VALUE | EXPIRES | MESSAGES |
|---|---|---|---|---|---|
| Not Viewed | 6/18/07 2:51PM | 6/18/07 - Washington D.C. view | $1500 | 32 Days | ✉ (1) 1 |
| Not Viewed | 6/18/07 2:51PM | 6/18/07 - Washington D.C. view | $1500 | 32 Days | ✉ (3) 3 |
| Sent Estimate | 6/18/07 2:51PM | 6/18/07 - Arlington, VA view | $1000 | Today | ✉ (15) |
| Sent Estimate | 6/18/07 2:51PM | 6/18/07 - Chevy Chase, MD view | $1000 | 2 days | ✉ (0) |
| Viewed | 6/18/07 2:51PM | 6/18/07 - Silver Spring, MD view | $1000 | 2 days | ✉ (14) 3 |
| Meet | 6/18/07 2:51PM | 6/18/07 - Bethesda, MD view | $1000 | 2 days | ✉ (32) |
| Viewed | 6/18/07 2:51PM | 6/18/07 - Rockville, MD view | $1000 | 2 days | ✉ (0) |

1212, 1214, 1216, 1218, 1220, 1222

1226 — ✉ Inbox (7)
1228 — ✗ Declined
1230 — 🗑 Expired

Q Quick Find
✉ New Messages

1210

Sort By [Newest Leads ▼] Refresh 1-100 of 220 Older > Oldest >>

About WeddingWire: About Us FAQ | Refer Engaged Couples | Help | Feedback | Labs
Connect With Us: Benefits Center | Vendor Catalog | Advertisers | Press | WeddingWire Blog
Legal: Terms of Use | Privacy Policy | Community Guidelines | Vow of Conduct

FIG. 12

METHOD AND MEDIUM FOR CROSS-CATEGORY WEDDING VENDOR RECOMMENDATIONS

FIELD

The present disclosure generally relates to providing vendor recommendations and, in particular, relates to systems and methods for providing cross-category wedding services vendor recommendations.

BACKGROUND

As internet usage continues to increase at home and work, users are increasingly comfortable managing their personal and professional lives online, dealing with on-line vendors from around the globe. However, the wedding industry is generally extremely localized. Each region has a local economy of vendor connections, and communities with distinct characteristics. Engaged couples and vendors typically spend a great deal of time and effort attempting to find each other. The overall experience for both the couples and the vendors is frustrating and time consuming due to the large number of vendors in each locale and the high fragmentation of the local market. As the wedding market continues to grow at a rapid pace, so do expenditures on weddings and related services.

Engaged couples are increasingly turning to on-line resources as the first place they search for wedding products, information, and registry services. Presently, such couples visit destination wedding websites to seek information, products and vendors. Such websites largely provide editorial content regarding weddings. Recognizing the trend of increased internet usage, traditional vendors of wedding services are transitioning their businesses on-line. However, present systems and methods provided by vendors do not create a platform that helps engaged couples by reducing the time, complexity, difficulty, and hassle of planning and executing a localized wedding. As with many of their off-line equivalents, the present on-line vendor offerings are single-service or single product focused.

On the vendor side, wedding vendors are struggling to market themselves on-line in the fragmented and local wedding industry, as increasingly more engaged couples are utilizing the Internet as a primary wedding planning resource. For example, vendors continue to struggle with the complexity of such systems and methods that provide "pay-per-click" advertising, site-targeted advertising for both text and banner advertisements, as well as the effectiveness of traditional print advertising. In order to reach newer generations of engaged couples, vendors of wedding related services need systems and methods to target potential clients, as well as market wedding related services to such clients.

It is desirable to provide aggregate local knowledge and experience, and providing an efficient matching engine between engaged couples and wedding related service vendors. It is desirable to have a comprehensive source for finding and vetting local vendors of wedding related services.

It is desirable to empower vendors of wedding related services by providing more choice and efficiency in acquiring leads for clients and converting such leads into actual business for a vendor. It is further desirable to provide vendors of wedding related services by providing increased choices and efficiency in acquiring leads and converting leads into business. It is further desirable to provide vendors of wedding related services new channels for acquiring business, and have greater control over how vendors allocate funds for marketing purposes.

SUMMARY

Exemplary embodiments provide systems and methods for providing cross-category wedding vendor recommendations. The exemplary systems and methods enable users to select vendors of wedding related services to engage in local wedding execution.

The exemplary systems and methods provide a comprehensive, local vendor catalog that may include reviews. The exemplary system and methods enable a couple to "bid out" their wedding, bringing vendors directly to them and reducing the inconvenience of contacting individual vendors of wedding related services directly. Based on one or more personal preferences, the exemplary systems and methods may match engaged couples to vendors, thereby quickly and efficiently connecting buyers and sellers together to create a more efficient marketplace. By providing engaged couples with a single point-of-comparison shopping (validated by feedback and ratings from those who have used the vendors to provide wedding related services), couples may be empowered to make improved decisions in selecting their vendors of wedding related services in a more efficient manner. The exemplary systems and methods enable vendors to receive qualified leads for clients. By selectively choosing leads, a vendor may increase the efficiency of their business, lower customer acquisition costs, and have a higher return on investment.

Exemplary embodiments as described herein relate to providing a list having one or more wedding services vendors. A valid set of vendors may be determined based on one or more received input data. A score for each respective vendor of the valid set of vendors may be determined using the received input data and input data weighting rules. One or more recommended vendors may be provided to a user based on the determined valid set of vendors and the respective score for each respective vendor of the valid set of vendors.

Exemplary embodiments as described herein relate to managing electronic communications for wedding services. An interface is provided for enabling a vendor to present an electronic storefront related to the one or more wedding services offered by the vendor. An interface is also provided for the vendor to manage client leads for the wedding services received by the electronic storefront. Interfaces are also provided for managing the solicitation of one or more reviews from clients who received the wedding services from the vendor, and to associate one or more received reviews with the electronic storefront.

The disclosure also encompasses program products for implementing cross-category wedding vendor recommendations of the type outlined above. In such a product, the programming is embodied in or carried on a machine-readable medium.

Additional features will be set forth in the description below, and in part will be apparent from the description, or may be learned by practice of the exemplary embodiments. The exemplary embodiments will be realized and attained by the structure particularly pointed out in the written description and claims hereof as well as the appended drawings.

It is to be understood that both the foregoing general description and the following detailed description are exemplary and explanatory and are intended to provide further explanation of the claims.

BRIEF DESCRIPTION OF THE DRAWINGS

The accompanying drawings, which are included to provide further understanding of the exemplary embodiments and are incorporated in and constitute a part of this specification, illustrate embodiments and together with the description serve to explain the embodiments. In the drawings:

FIGS. 10-14 depict displays enabling a vendor to provide business information, interact with potential clients and other vendors, and manage client leads according to an exemplary embodiment.

DETAILED DESCRIPTION

In the following detailed description, numerous specific details are set forth to provide a full understanding of the exemplary embodiments. It will be obvious, however, to one ordinarily skilled in the art that the embodiments may be practiced without some of these specific details. In other instances, well-known structures and techniques have not been shown in detail so as not to obscure the embodiments.

Figure 1:
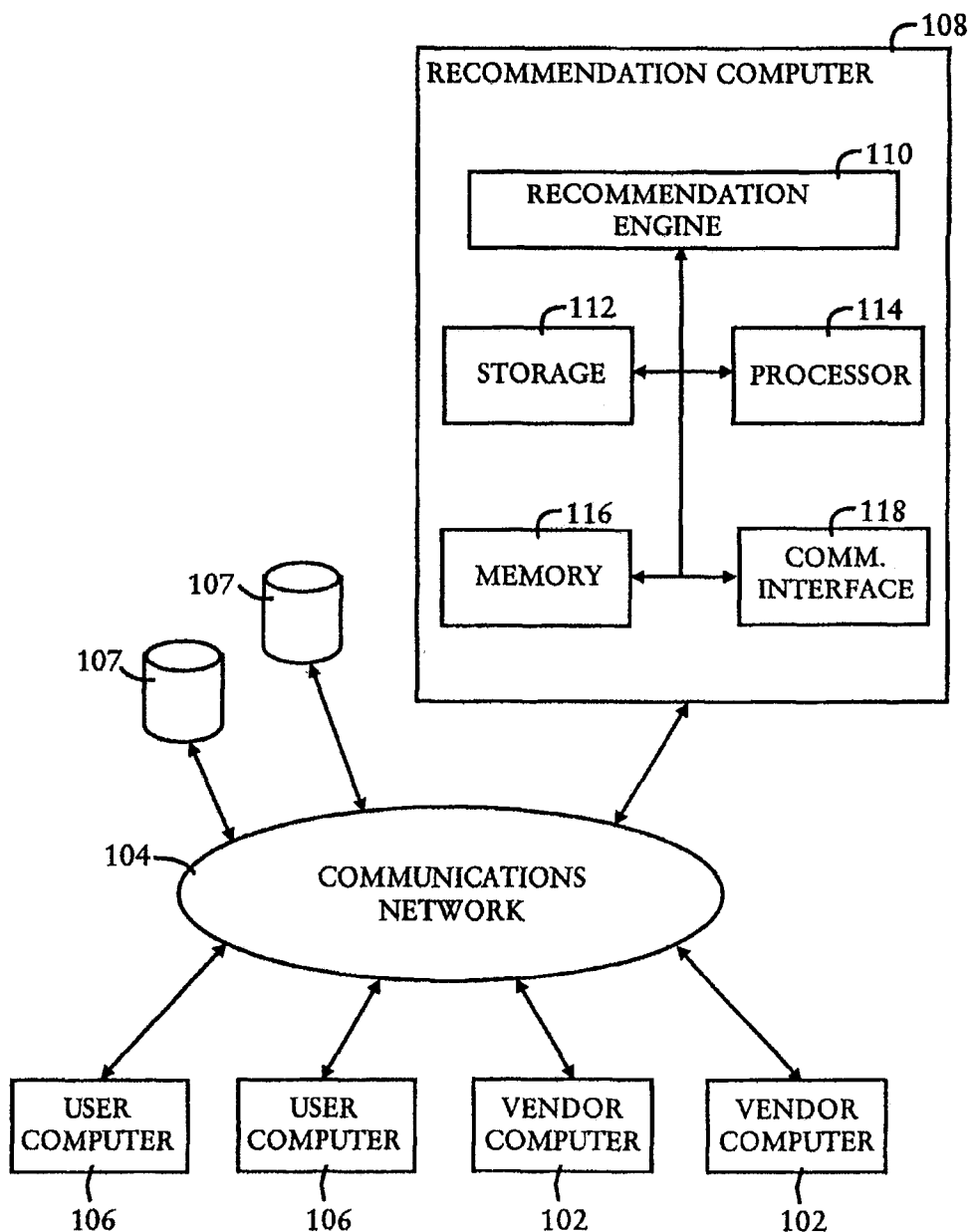
FIG. 1 illustrates an exemplary cross-vendor recommendation system according to an exemplary embodiment.

FIG. 1 illustrates an exemplary system 100 for providing cross-category wedding vendor recommendations. System 100 may include one or more vendor computers 102 communicatively coupled to communications network 104. Communications network 104 may be a local area network, a wide area network, the Internet, or any other suitable communications network. One or more user computers 106 also may be communicatively coupled to communications network 104. One or more digital data storage devices 107 may also be communicatively coupled to network 104. Vendor computers 102, user computers 106, or recommendation computer 108, or any combination thereof may store and retrieve data from the one or more digital data storage devices 107.

Recommendation computer 108 may be one or more server computers or other computing devices. Recommendation computer 108 may be configured with recommendation engine 110, which may be implemented in software (e.g., firmware), hardware, or a combination thereof. Preferably, recommendation engine 110 is implemented in software, as an executable program, and is executed by one or more special or general purpose digital computer(s) such as recommendation computer 108, or a server, personal computer, personal digital assistant, workstation, minicomputer, or mainframe computer. Recommendation engine 110 may reside in, or have portions residing in, any computer such as, but not limited to a server computer. Therefore, recommendation computer 108 of FIG. 1 may be representative of any computer in which recommendation engine 110 resides or partially resides.

Generally, in terms of hardware architecture, recommendation computer 108 may include one or more digital storage devices 112, processor 114, memory 116, and communications interface 118 that may be communicatively coupled with one another, e.g., with a local interface that may include but is not limited to, one or more buses or other wired or wireless connections. The local interface may include address, control, and/or data connections to enable appropriate communications among the other computer components.

Processor 114 may be a hardware device for executing software, particularly software stored in digital storage device 112, memory 116, or digital data storage device 107, or any combination thereof. Processor 114 may be any custom made or commercially available processor, a central processing unit (CPU), an auxiliary processor among several processors associated with recommendation computer 108, a semiconductor based microprocessor (in the form of a microchip or chip set), or generally any device for executing software instructions.

Memory 116 may include any one or a combination of volatile memory elements (e.g., random access memory (RAM, such as DRAM, SRAM, SDRAM, etc.)) and nonvolatile memory elements (e.g., ROM, hard drive, tape, CD-ROM, etc.). Moreover, memory 116 may incorporate electronic, magnetic, optical, and/or other types of storage media. Memory 116 can have a distributed architecture where various components are situated remote from one another, but can be accessed by processor 114.

The software in storage 112, memory 116, and/or digital data storage device 107 may include one or more separate programs, each of which comprises an ordered listing of executable instructions for implementing logical functions. In the example of FIG. 1, the software in memory 116 may include recommendation engine 110 in accordance with the present invention and a suitable operating system (O/S). The operating system essentially controls the execution of other computer programs, such as the recommendation engine, and provides scheduling, input-output control, file and data management, memory management, and communication control and related services.

Recommendation engine 110 may be a source program, executable program (object code), script, or any other entity comprising a set of instructions to be performed.

When recommendation computer 108 is in operation, processor 114 is configured to execute software stored within storage 112, memory 116, and/or digital data storage device 107 to communicate data to and from storage 112, memory 116, and/or digital data storage device 107, and to generally control operations of recommendation computer 108 pursuant to the software.

Figure 3:
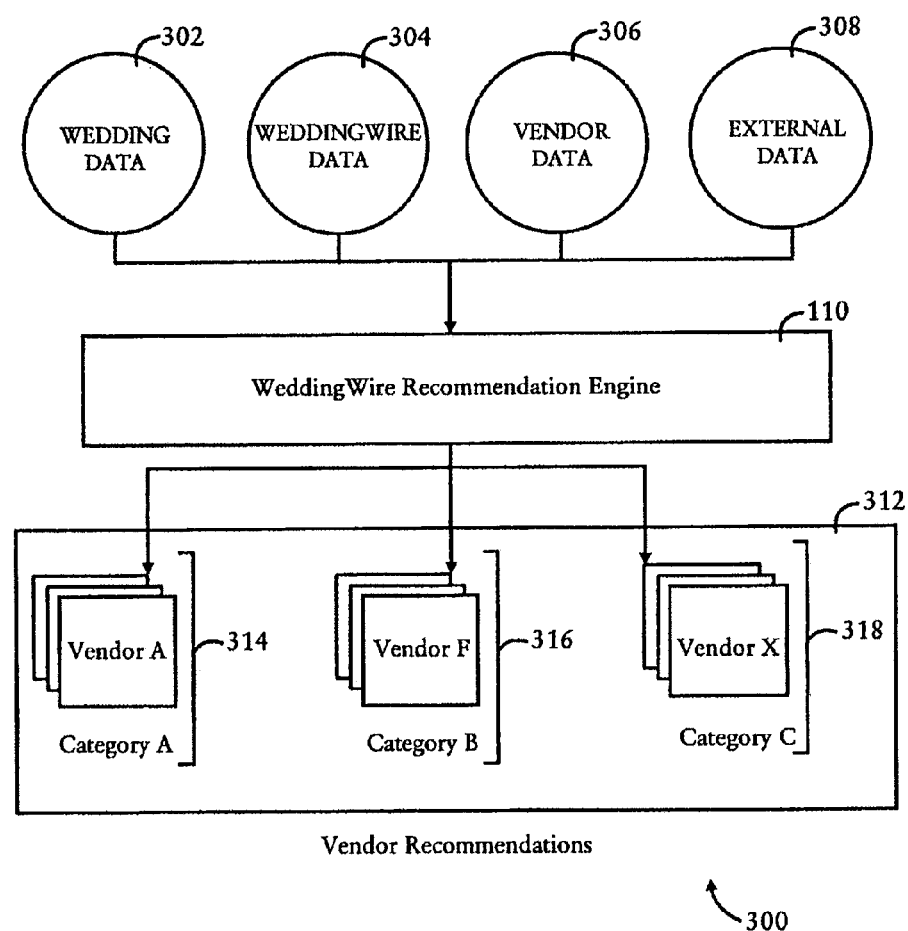
FIG. 3 illustrates a block diagram of the data sources, recommendation engine and vendor recommendation outputs according to an exemplary embodiment.

When recommendation engine 110 is implemented in software, as is shown in FIG. 3, it should be noted that recommendation engine can be stored on any computer readable medium for use by or in connection with any computer related system or method. In the context of this document, a "computer-readable medium" can be any means that can store, communicate, propagate, or transport the program for use by or in connection with the instruction execution system, apparatus, or device. Recommendation engine 110 may be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In another embodiment, where recommendation engine may be implemented in hardware, recommendation engine may be implemented with any or a combination of the following technologies: discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Recommendation computer 108 may, for example, utilize programming in storage 112 or memory 116 such as J2EE (Java Platform, Enterprise Edition), a widely used platform for server programming in the Java programming language. The J2EE Platform provides libraries which provide functionality to deploy fault-tolerant, distributed, multi-tier Java software, based largely on modular components running on an application server (e.g., recommendation computer 108).

The programming platform (e.g., programming platform 200 shown in FIG. 2) of recommendation computer 108 may utilize enterprise-grade technology components, including, but not limited to, Java, Apache Tomcat, JBoss, and MySQL.

Figure 2:
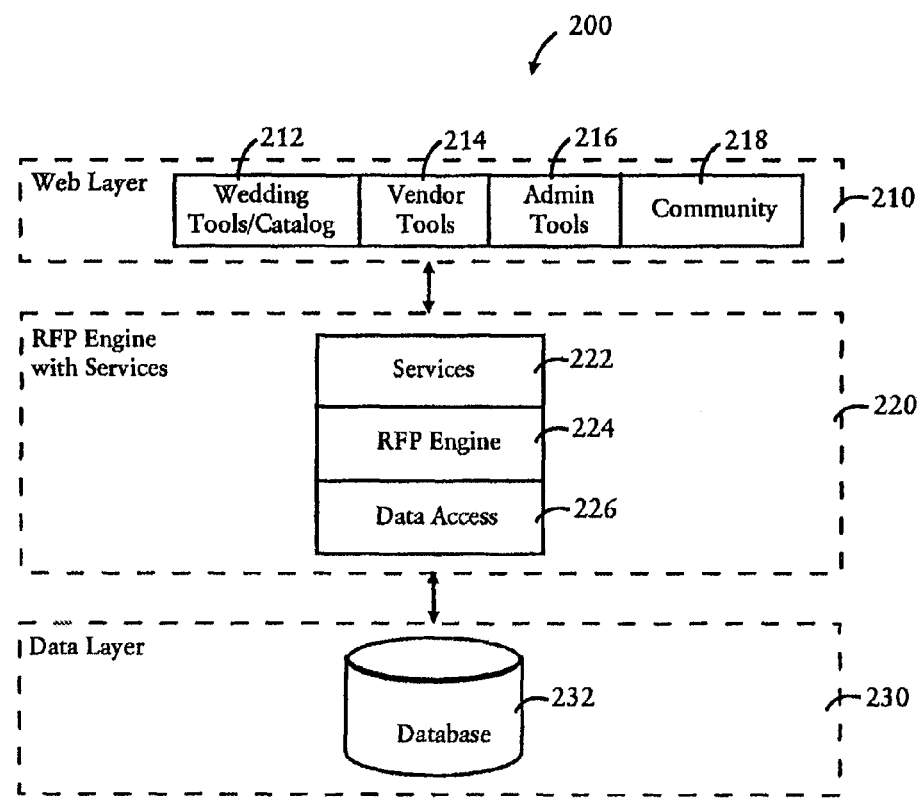
FIG. 2 is a block diagram depicting the layered architecture of the cross-vendor recommendation system according to an exemplary embodiment.

As illustrated in FIG. 2, programming implemented on recommendation computer 108 may comprise a plurality of layers. The layers may be, for example, web layer 210, request for proposal (RFP) engine with related services 220, or data layer 230, or any other suitable layers. Layers 210, 220, and 230 may be independently scaled so as to accommodate growth of system 100. Platform 200 of recommendation computer 108 may be integrated with a billing gateway (not shown) to enable electronic commerce services.

Figure 11:
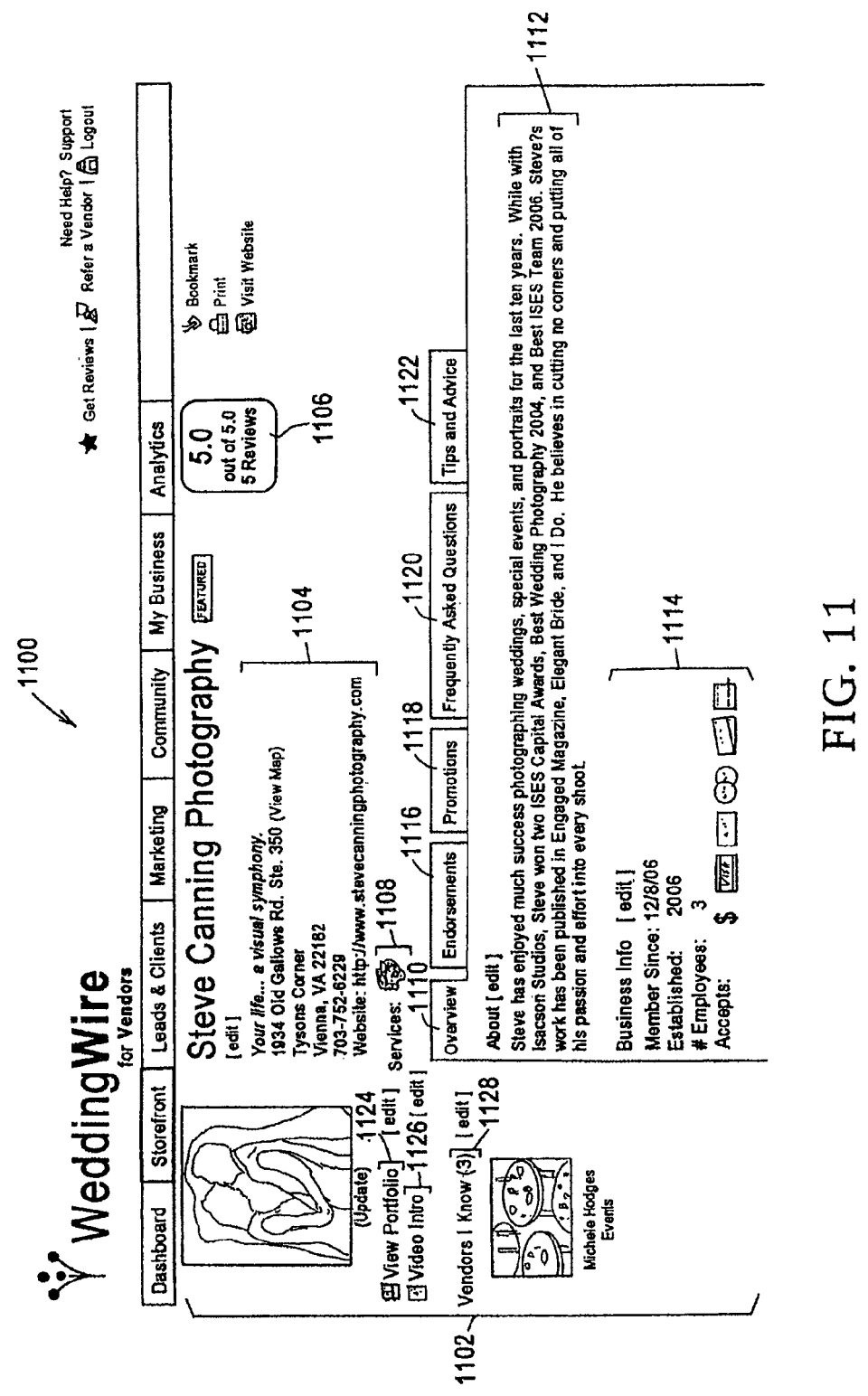
Figure 13:
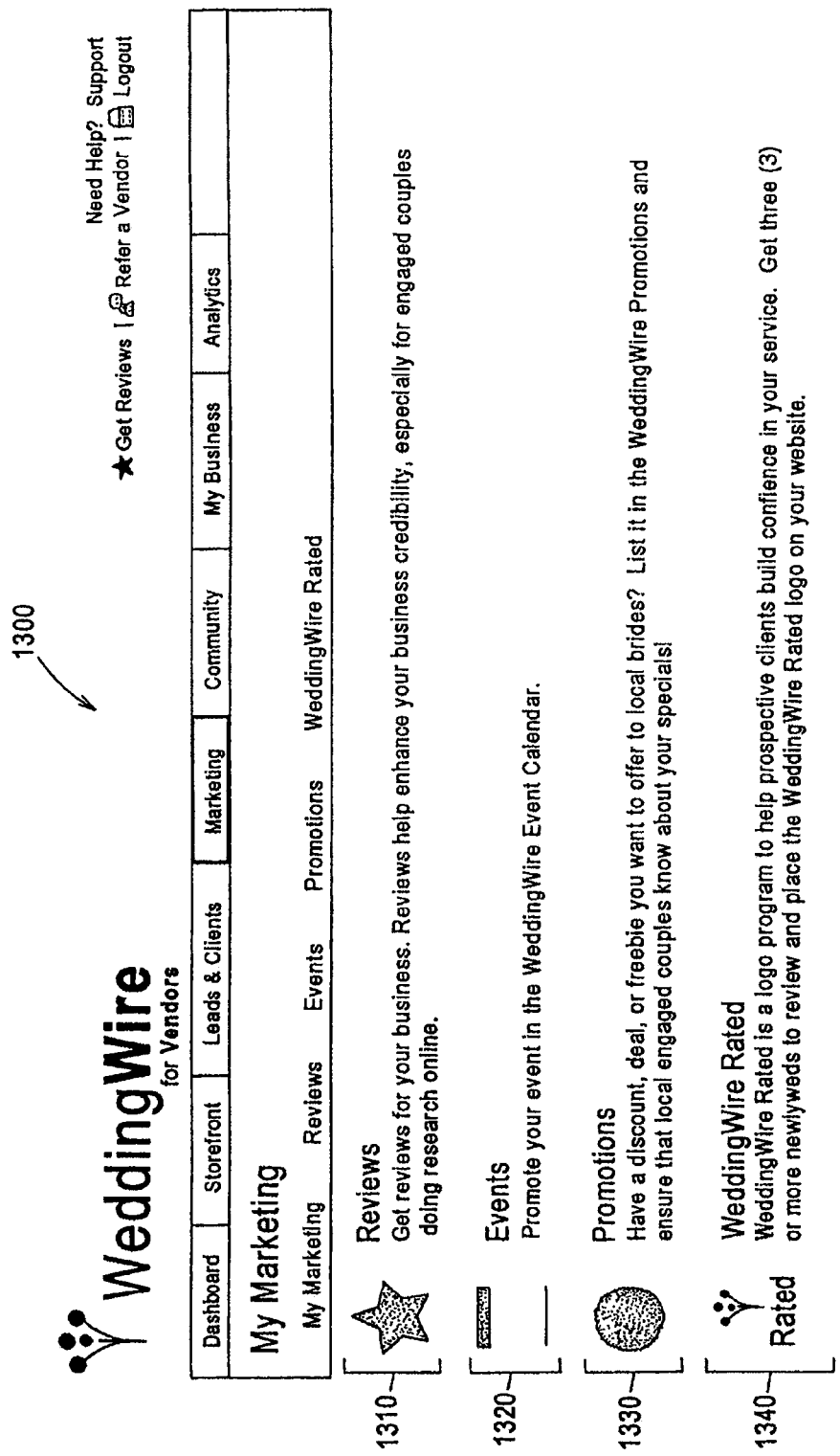
Figure 14:
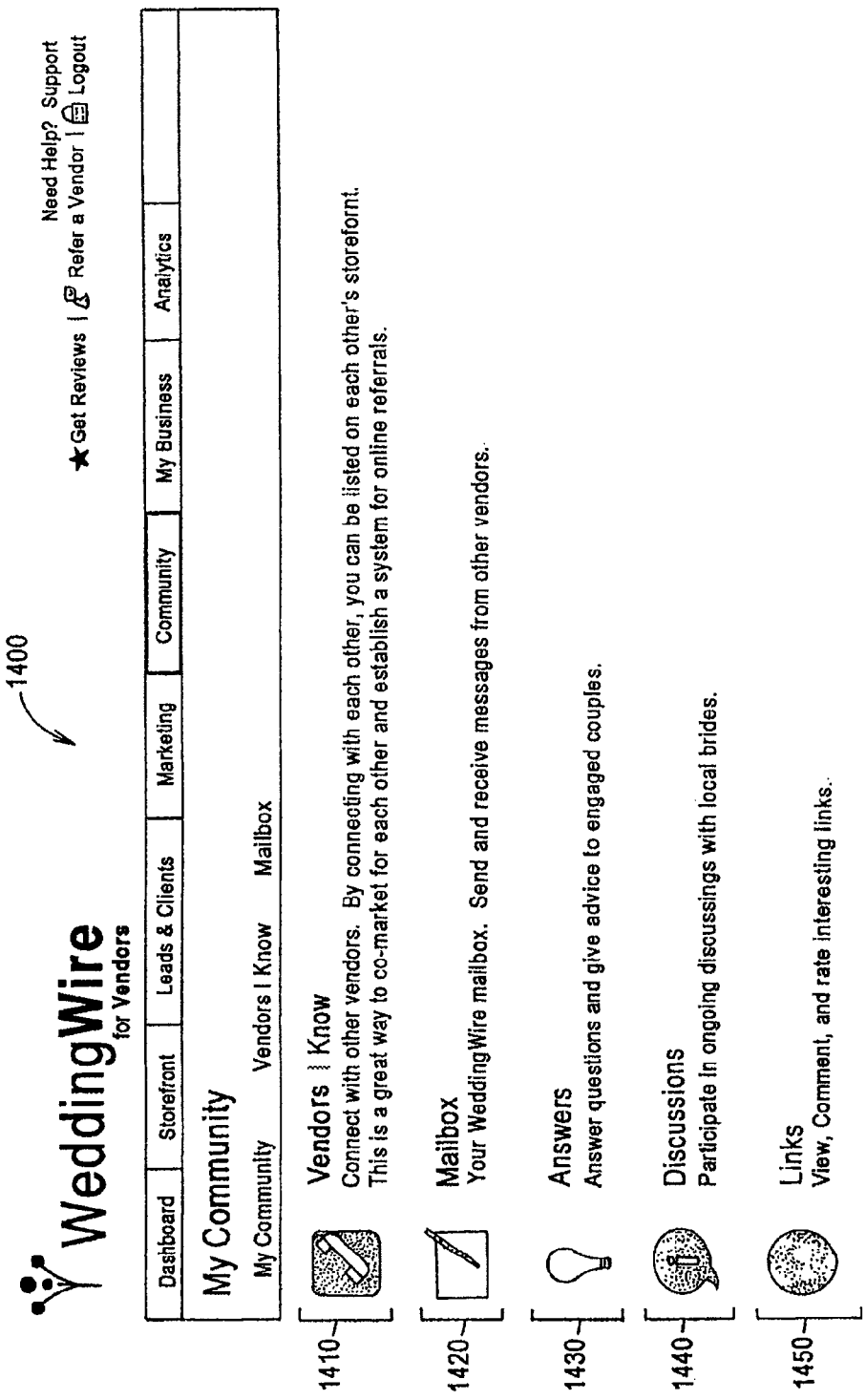

Web layer 210 may utilize, for example, Java Struts, AJAX, and/or user interface design packages (e.g., Yahoo® User Interface Library, etc.) to provide consistent and reliable behaviors across different web browsers implemented on user computers 106. Web layer may include modules such as wedding catalog 212, vendor tools 214, administration tools 216, community 218, or any other suitable module, or any combination thereof. Wedding catalog 212 may include data related to vendors, categories of wedding related services, geographic regions served by various vendors, or any other suitable information. Vendor tools 214 may include potential client lead management tools (e.g., as illustrated in FIG. 12), vendor storefront development and management tools (e.g., as illustrated in FIG. 11), marketing tools (e.g., as illustrated in FIG. 13), or any other suitable tools. Community module 218 may provide community communications tools between users and vendors, or amongst vendors (e.g., as illustrated in FIG. 14).

RFP engine with services layer 220 may include sublayers, such as services layer 222, RFP engine layer 224, data access layer 226, or any other suitable sublayer. Services layer 222 may be related to providing services (e.g., enabling a user to search for a vendor in a particular geographic location) to users, vendors, or both. RFP engine layer 224 may be related to enabling users to submit "bids" for services to one or more selected vendors. Data access layer 226 may related to enabling RFP Engine layer 220 to store and retrieve vendor or customer data from data layer 232. Data layer 230 may have database 232, which may store, for example, vendor profile data, system user profile data, or any other suitable information.

FIG. 3 illustrates an exemplary flow 300 for providing vendor recommendations (e.g., using system 100 of FIG. 1). Data from wedding data 302, system data 304, vendor data 306, or external data 308, or any combination thereof may be utilized. Data 302, 304, 306, and/or 308 may be stored, for example, in digital data storage devices 107, storage 112, or in memory 116 of FIG. 1, or in any combination thereof.

Wedding data 302 may include, but are not limited to: a date of the wedding, total wedding budget, budget for each type of wedding related service, number of vendors selected by a user to perform wedding related services, one or more names of vendors selected by a user to perform wedding related services, number of vendors that have not been selected by a user to perform wedding related service, one or more names of vendors that have not been selected by a user to perform wedding related services, or any combination thereof.

System data 304 may include data indicating one or more relationships between one or more vendors of wedding related services, data indicating one or more relationships between one or more brides, data related to wedding cost trends over a period of time, or any other suitable data, or any combination thereof.

Vendor data 306 may include one or more dates of availability, pricing range of wedding related services, vendor rating data, vendor review data, vendor endorsement data, a list including one or more other vendors of wedding related services that a particular vendor has worked in conjunction with, or any other suitable data, or any combination thereof.

External data 308 may include vendor website data, number of visitors to a vendor website, review data for one or more vendors presented on one or more websites, or any other suitable data, or any combination thereof.

Recommendation engine 110, which is also illustrated in FIG. 1 and discussed above, may process wedding data 302, system data 304, vendor data 306, external data 308, any other suitable data, or any combination thereof to provide vendor recommendations 312 for a user for one or more vendors in a particular services category. Services categories may include, but are not limited to: bands; beauty and attire; bakeries and cake; catering; ceremony music; DJs (disc jockey); dress; florist; invitations and favors; jewelry; officiant; photography; wedding planner; event rentals; transportation; venue; or videographers.

As illustrated in FIG. 3, vendor recommendations 314 may be provided by recommendation engine 110 for a first category of wedding related services (e.g., photographers, etc.). In addition, recommendation engine 110 may provide one or more vendor recommendations 316 for a second category (e.g., florists, etc.), or vendor recommendations 318 for a third category (e.g., venues, etc.). Additional vendor recommendations may be provided by recommendation engine 110 for other categories of wedding related services (e.g., bakeries, entertainment, videographers, etc.).

In providing vendor recommendations, recommendation engine 110 may utilize vendor profile information that may be stored, for example, with vendor data 306 or in other suitable databases (e.g., system data 304, external data 308, etc.). Vendor profile information may be related to one or more categories of wedding related services offered. Vendor profiles for an exemplary "band" category may include, price range of services, geographical regions served, genres of music played (e.g., acoustic, jazz, classical, rock, country, etc.), or any other suitable information. Vendor profiles for an exemplary "beauty and attire" category may include, for example, price range of services, geographic regions served, services provided (e.g., hair, makeup, nails, facial treatments, etc.), or any other suitable information. Vendor profiles for a bakeries (i.e., cake providers) category may provide price range, geographic regions served, size options, style options, flavor options, or any other suitable information. Vendor profiles for an exemplary catering category may include price range, geographic regions served, maximum food service capacity (i.e., maximum number of people that caterer can serve), services provided (e.g., seated dinner, buffet, hors d'oeuvres, etc.), types of cuisine offered (e.g., Asian, Italian, vegetarian, etc.), alcoholic beverage services (e.g., full bar, beer, wine, champagne, etc.), or any other suitable information.

Vendor profiles for a ceremony music category may include price range, geographic regions served, musical group category (e.g., string quartet, vocalist, pianist, organist, etc.), instruments played (e.g., cello, flute, piano, etc.), or any other suitable information. Vendor profiles for a DJ category may include types of music played, price range, geographic regions served, or other suitable information.

Vendor profiles for a "dress" category may include price range, designers or brand information, geographic regions served, or any other suitable information. Vendor profiles for an exemplary florist category may include price range, types of flowers, arrangements, geographic regions served, or any other suitable information. Vendor profiles for an exemplary "invitations and favors" category may include price range, geographic regions served, products offered (e.g., custom invitations), services offered (e.g., assembly of invitations and materials, design services, print services, etc.). Vendor profiles for an exemplary jewelry category may include products offered (e.g., brands offered, materials offered, styles offered, etc.), services offered (e.g., custom designs, etc.), price range, geographic region served, or any other suitable information.

Other vendor profiles may include vendor profiles for an officiant category that may include services offered (e.g., single faith, interfaith, non-religious, etc.), religious services offered (e.g., Christian-Baptist, Buddhist, Jewish, etc.), accommodation for the hearing impaired, services for same-sex marriages, price range, geographic region served, or any other suitable information. Vendor profiles for photography may include photograph package options, venues the photographer has photographed in previously, price range, geographic region served, or any other suitable information.

Vendor profiles for wedding planners may include range of services offered, price range, geographic region served, or any other suitable information. For the category of event rentals, the vendor profile may include products available (e.g., chairs, linens, barware, etc.), price range, geographic region served, or any other suitable information. Vendor profiles for a transportation category may include vehicles available (limousine, shuttle, classic vehicle, horse and carriage, etc.), price range, geographic region served, or any other suitable information. Vendor profiles for a venue category may include maximum capacity, events hosted (e.g., ceremony, reception, rehearsal dinner, etc.), on-site catering, whether outside catering is allowed, settings available (e.g., indoor space, outdoor space, etc.), type of venue (e.g., church, mansion, hotel, etc.), religious affiliations associated with the venue (e.g., Christian-Baptist, Catholic, Buddhist, Jewish, etc.), types of cuisine offered (e.g., Asian, Italian, vegetarian, etc.), price range, geographic region served, or any other suitable information. For the category of videography, vendor profile information may include services offered (e.g., record the ceremony, record the reception events, etc.), products offered (e.g., edited video available on one or more media formats, etc.), price range, geographic region served, or any other suitable information.

Figure 4:
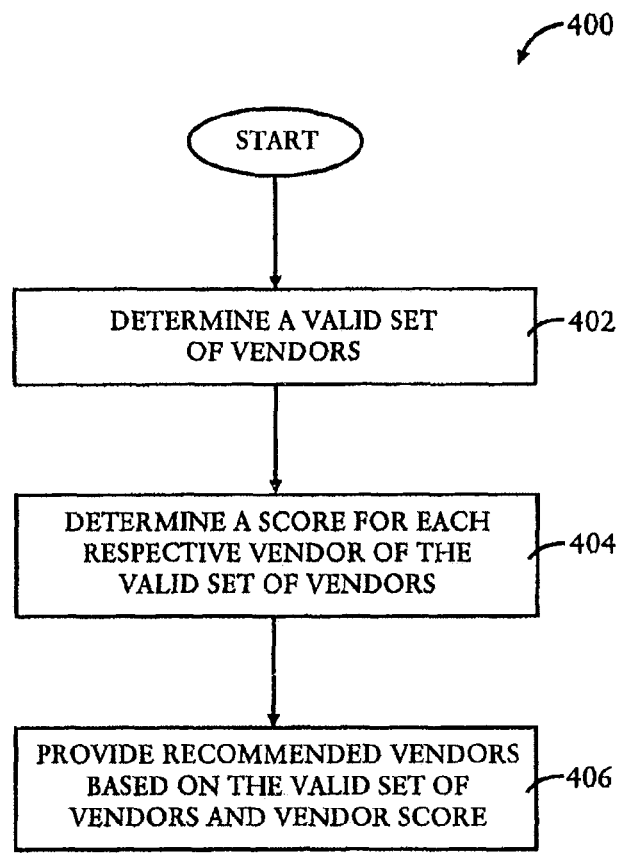
FIG. 4 illustrates a flow diagram for providing a list having one or more wedding services vendors according to an exemplary embodiment.
Figure 5:
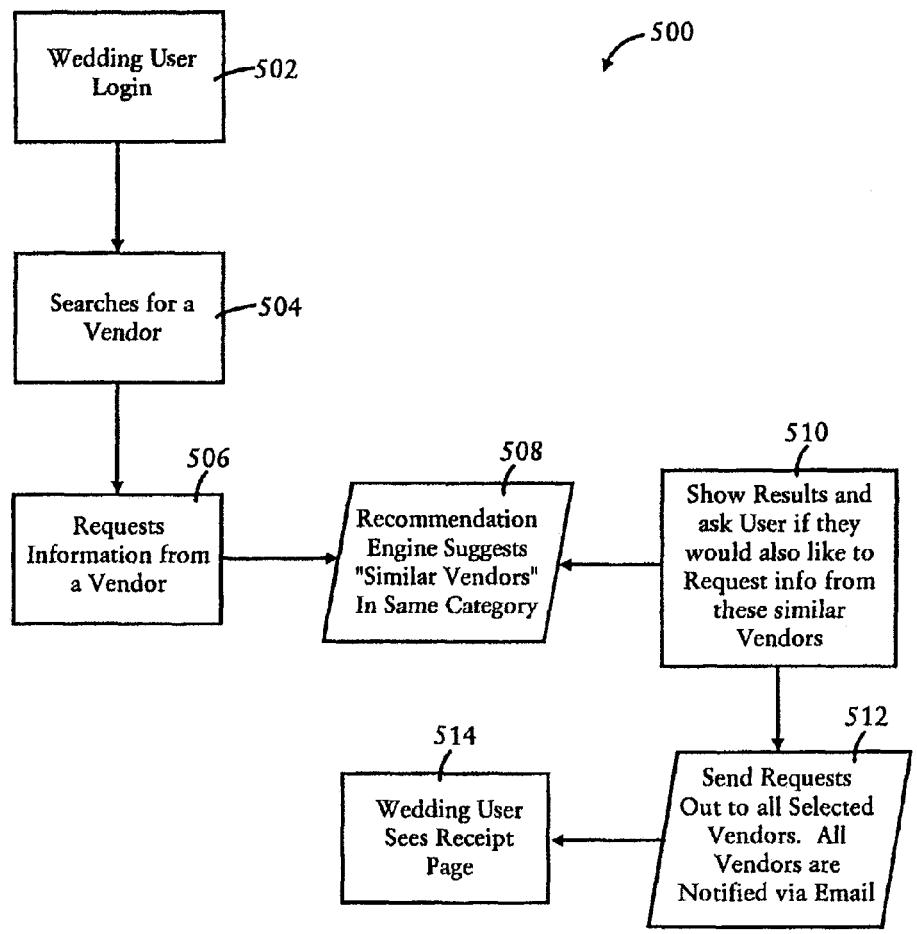
FIG. 5 illustrates a flow diagram for requesting information from recommended vendors according to an exemplary embodiment.
Figure 6:
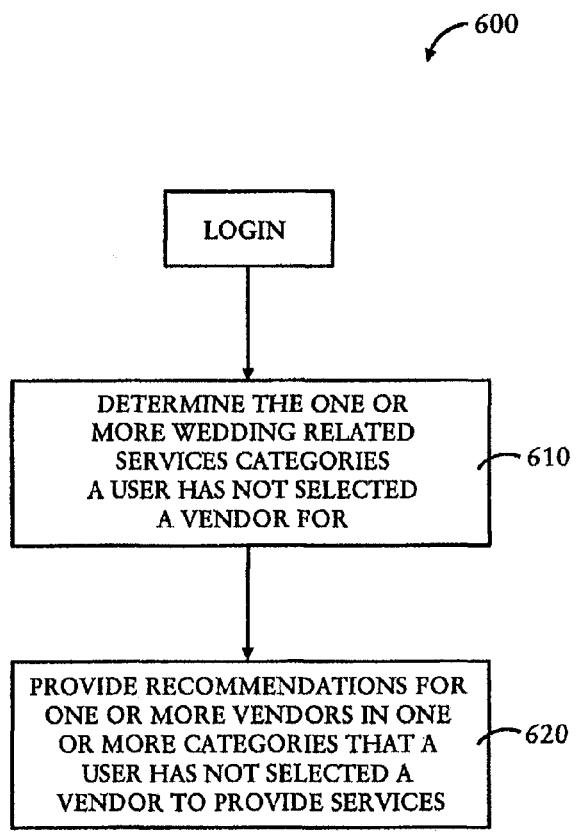
FIG. 6 depicts a flow diagram for providing recommendations of vendors of wedding related services in one or more categories that a user has not booked vendor services for according to an exemplary embodiment.

FIGS. 4-6, as described below, provide exemplary methods for recommendation engine 110 of FIGS. 1 and 3 to determine vendors to recommend to a user based on the data described above in connection with FIG. 3 (e.g., wedding data 302, system data 304, vendor data 306, external data 308, vendor profiles, etc.).

FIG. 4 illustrates an exemplary method 400 for providing recommended wedding service vendors. At block 402, a valid set of vendors may be determined. This determination may be made by recommendation computer 108 of FIG. 1. The valid set of vendors may be based on received input from a user (e.g., from a user computer, wherein a vendor category is selected), or from data associated with a user (e.g., wedding data 302, system data 304, external data 308, etc.), or any other suitable data. The user data may be compared with vendor data (i.e., vendor profiles), for example, by recommendation computer 108 so as to determine a valid set of vendors that may relate to the criteria of the received input or user data. For example, the received input data may be a wedding services business name, a wedding services vendor type, geographic region data, data indicating the user has already selected a vendor for a wedding related service, data indicating a user is interested in one or more specific wedding related service vendors, data indicating a recommended final date by which a user is to have selected a wedding related services vendor, data indicating that a user has received information from one or more vendors, data indicating that a user has received pricing information from one or more vendors, or data indicating a user has engaged in electronic communications with one or more vendors, or any combination thereof. The received inputted data may include one or more service categories, with each service category having one or more components that are related to a respective service category.

Determining the valid set of vendors at block 402 may also include determining the availability of each respective wedding services vendor, such as whether each respective vendor is available to render wedding related services on at least one date indicated by the received input data. Also, in determining the valid set of vendors, whether a vendor has been previously selected by a user for a wedding related service may also be determined.

At block 404, a score for each vendor of the valid set of vendors may be determined. The score may be based at least in part on the received input data, and may also be based on input data weighing rules. Weighting rules may be stored, for example, as system data 304 (in FIG. 3). Weighting rules may be used to indicate that particular data provided by a user has greater or lesser importance to selecting a vendor than other input data. Determining the score for each respective vendor of the valid set of vendors may include determining if user budget data of the received input data corresponds to a respective vendor's pricing data. Some weighting rules may increase a weighting parameter assigned to the one or more vendors based on the respective review scores received by each vendor, or based on a response time of a respective vendor responding to a user request, or any combination thereof. Scoring may be based on wedding data 302, system data 304, vendor data 306, or external data 308, or any other suitable data, or any combination thereof.

Determining the score for each respective wedding service vendor of the valid set of vendors comprises determining the number of reviews for the vendor services received. The reviews for a respective wedding services vendor within a predetermined time period are assigned an increased weighting parameter. The score of the review may be used as a weighting parameter. Scores of recent reviews from a predetermined period (e.g., within the previous hour, previous day, previous month, etc.) are assigned an increased weighting parameter.

The score for each respective vendor may be determined at least in part by an estimated success factor of a respective vendor meeting a selected budget received from a user. The score for each respective vendor may be based on the frequency to which a vendor matches the received input data. Also, the score for each respective vendor may be determined by the number of selections received to a vendor's listing, storefront, or review page, or any combination thereof. In addition, the vendor score may be based on the quantity or arrangement of information on a respective vendor's display page. The score for a vendor also may be based on one or more promotions by another vendor.

At block 406, a recommendation of one or more vendors for one or more categories of wedding related services may be provided to a user based at least in part on the vendor score and the valid set of vendors. The list of one or more recommended vendors may be a list of vendors that are or the same type (i.e., are in the same category) or different type (e.g., an adjacent type).

FIG. 5 illustrates an exemplary flow diagram for providing recommendations of vendors in a particular vendor category. This description and flow are exemplary only, as other flows and other specific method steps may be used. At block 502, a user may utilize a user computer 106 (illustrated in FIG. 1) to communicatively connect to recommendation computer 108 via communications network 104. Once communication has been established, a user may provide login information to recommendation computer 108 to access the recommendation services. Upon verification of the user identity via login, the user may be presented with one or more displays (e.g., display 700 illustrated in FIG. 7) that may allow a user to search for a particular vendor (e.g., using the name of the vendor) or category of vendor (e.g., photographer, videographer, florist, etc.) at block 504. From the one or more vendors presented to the user via the display, a user may select to receive additional information related to the vendor at block 506.

At block 508, a user may select to receive recommendations from the recommendations engine (e.g., recommendations engine 110 of recommendation computer 108 shown in FIG. 1) to provide recommendations of one or more other vendors similar (e.g., based on vendor profile information, etc.) to the vendor selected by the user that may be in the same vendor category (e.g., photographer, videographer, florist, etc.). At block 510, the recommendation results are presented to the user, and the presentation may also include options for a user to select to receive information from at least one vendor of the one or more recommended similar vendors displayed. At block 512, recommendation computer 108 of FIG. 1 may receive the vendor information requests from the user, and may direct the requests to the selected vendors. For example, the vendors may be notified by electronic mail or any other suitable electronic communication regarding the request from the user. At block 514, recommendation computer 108 (FIG. 1) may present a confirmation display that the requests for information have been provided to the selected vendors.

FIG. 6 is a flow diagram illustrating exemplary method 600 of providing cross-category recommendations of one or more vendors. At block 610, a user may utilize a user computer (e.g., user computer 106 illustrated in FIG. 1) to communicatively connect to a server (e.g., recommendation computer 108 of FIG. 108) via a communications network (e.g., communications network 104 of FIG. 1). Once communication has been established, a user may provide login information to recommendation computer 108 to access the recommendation services. Upon verification of the user identity via login, recommendation computer 108 configured with recommendation engine 110 may determine the one or more wedding related services categories for which a user has not selected (i.e., booked) a vendor. This may be based, for example, on the user data stored as wedding data 302, system data 304, or external data 308 (see FIG. 3), or any combination thereof. Vendor profile data stored, for example, as vendor data 306 in FIG. 3 may be compared with the user data at least in part in determining cross-category recommendations for one or more vendors.

Figure 7:
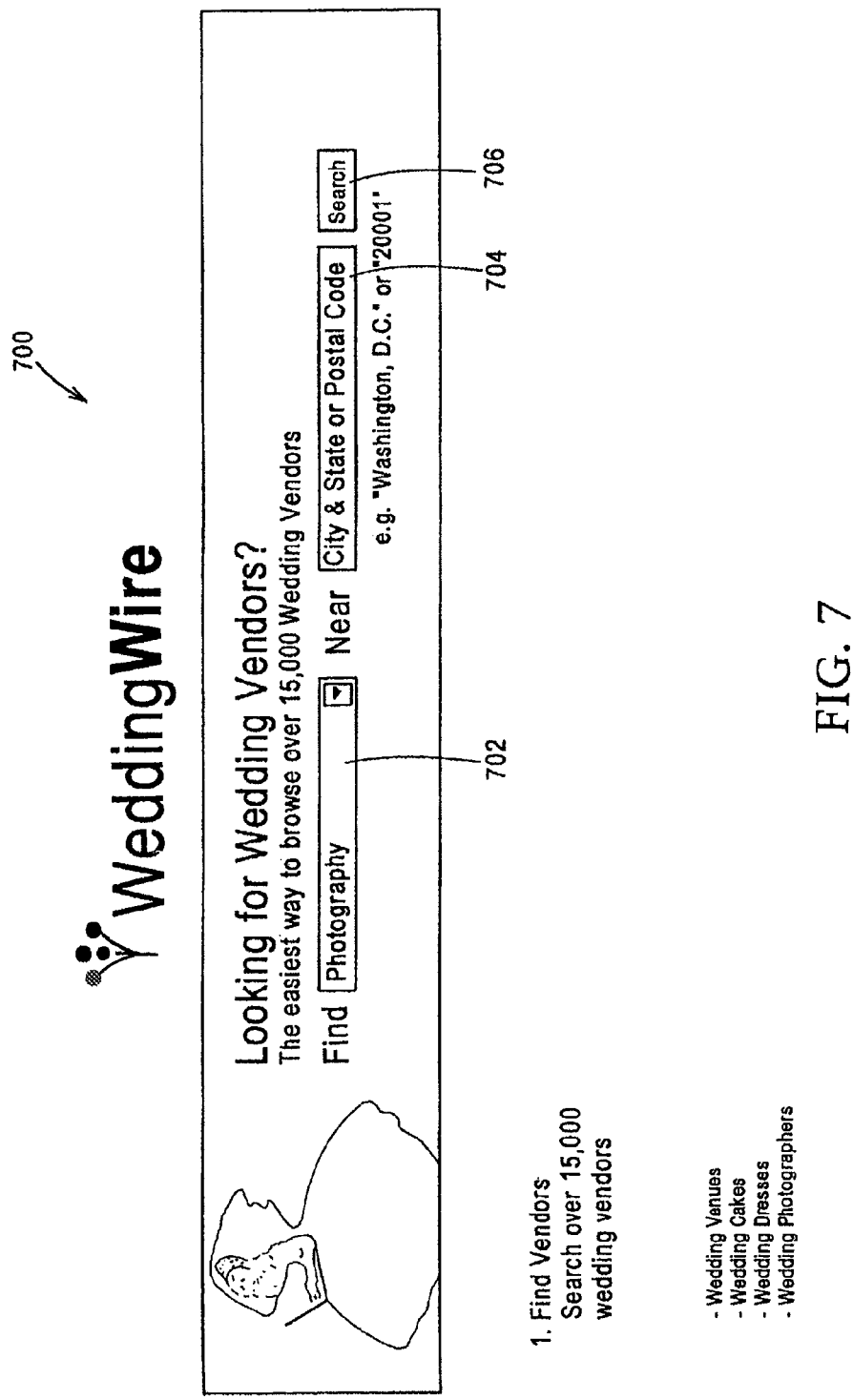
FIGS. 7-8 are displays enabling a user to search for vendors of a particular type in a geographic region according to an exemplary embodiment.
Figure 8:
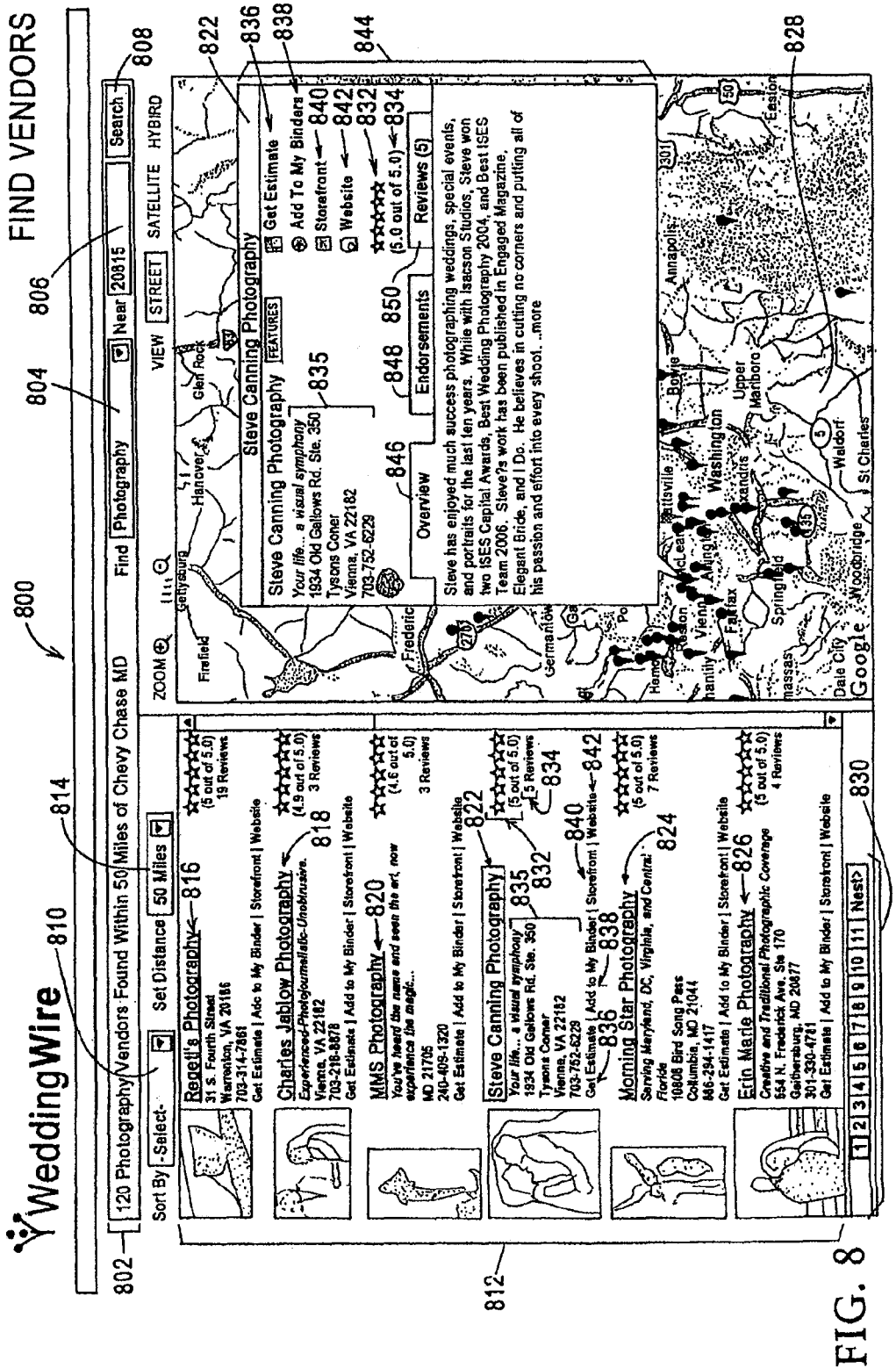
Figure 9:
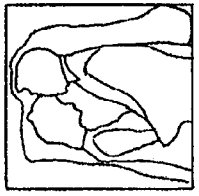
FIG. 9 is a display enabling a user to read reviews of vendors according to an exemplary embodiment.

FIGS. 7-9 illustrate exemplary displays presented to a user (e.g., user computer 106 shown in FIG. 1) for searching for vendors of wedding related services, obtaining information on vendors in a particular category and geographic region, and viewing reviews written by one or more other users (e.g., newlywed couples) of the quality of the vendor services.

FIG. 7 illustrates an exemplary display 700 that enables a user to select a category for vendors providing wedding related services from drop-down menu 702. Vendor categories may include, but are not limited to bands, beauty and attire, cake, catering, ceremony music, DJ (disc jockey), dress, florist, invitations and favors, jewelry, officiant, photography, wedding planner, event rentals, transportation, venue, or videographer, or any other suitable category, or any combination thereof. Users may also provide location information in location text box 704. A user may provide location information such as street address, city, state, or postal code (i.e., ZIP code), or any other suitable address information. Upon selecting a category and/or providing location information, a user may select search button 706 to perform a search for vendors providing the service category selected from drop down menu 702 in the area of the location information provided in text box 704.

FIG. 8 illustrates an exemplary display 800 depicting results from a search entered by selecting a vendor category and location in FIG. 7. In this example, the vendor category selected from drop down menu 702 of FIG. 7 was photography, and the location entered in text box 704 was Chevy Chase, Md. (MD). As indicated in display 800 of FIG. 8, results summary 802 indicates that 179 photography vendors were located within a 50 mile radius of Chevy Chase, Md. The vendor category is displayed in drop down menu 804 and the postal code (i.e., ZIP code) for Chevy Chase, Md. (i.e., 20815) is indicated in location text box 806. The category in drop down menu 804 and/or the location information in text box 806 may be changed by the user, and search button 808 may be selected to perform a new or modified search.

Drop down menu 810 may enable a user to sort search results 812 by one or more criteria. For example, search results 812 may be sorted by alphabetical order, price, location distance relative to the user, ratings, or number of reviews, or any other suitable sorting criteria. Upon selection of a sorting criteria in drop down menu 810, search results 812 may be correspondingly updated. Search results 812 may be further increased or decreased by selecting a distance from drop down menu 814. Exemplary distances may be 5 miles or less, 10 miles, 25 miles, 50 miles, 75 miles, or 100 miles, or any other suitable distance. Upon selection of a distance from drop down menu 814, search results 812 may be accordingly updated.

Search results 812 may include one or more vendor listing results (e.g., vendor listing results 816, 818, 820, 822, 824, 826, etc.) that include the name of the vendor of wedding related services for the selected category of services. The geographic location of one or more of the search results may be displayed on map 828. Additional search results which are not presented within display 800 may be displayed on subsequent displays that may be accessed by a user by selecting a display from display list 830. The address, phone number, email address, or web site, or other related contact information may be provided in a listing result (e.g., contact information 835 of vendor result 822, etc.). As shown, for example, in vendor listing result 820, the vendor of wedding services has a 4.6 (out of 5.0) rating, based on three user reviews. In vendor listing result 822, a user rating may be provided based on reviews from users of the services of the vendor. Vendor listing result 822 has rating 832, which is a 5.0 star rating (5.0 stars on a 5.0 scale), based on the indicated five reviews (i.e., number of reviews 834) from users.

As shown, the one or more vendor listing results (e.g., vendor listing results 816, 818, 820, 822, 824, 826, etc.) provided by recommendation computer 108 (FIG. 1) may be selectable by a user to "get estimate", "add to my binder", "storefront", "website", etc. For example, the selection of a user of get estimate 836 from vendor listing 822 may enable the user to receive an estimate for photography services. A user selecting add to my binder 838, may add the vendor to the list of vendors that a user is considering or that the user has contracted with for wedding related services. For example, the vendors added to a user's binder may be used to determine whether other vendors for different services have worked collaboratively with the one or more vendors in the user's binder. A user may also select storefront 840, which may enable system 100 of FIG. 1 to display a storefront webpage for the vendor that is affiliated with system 100. A user may also select website 842 to access a vendor's webpage (e.g., vendor computer 102 of FIG. 1 may provide data related to the website via network 104 to user computer 106).

A user may select a particular vendor listing (e.g., vendor listing 822) from vendor listing results 812. The selected vendor listing 822 may be displayed in vendor listing window 844 that may include vendor contact information 835, rating 832, number of reviews 834, selections (e.g., get estimate 836, add to my binder 838, storefront 840, website 842, etc.). Vendor listing window 844 may also include overview information 846 which may provide descriptive information regarding the background and services offered by the vendor. Also, a user may select endorsements 848 to view reviews from one or more other vendors that provide wedding related services and who have worked collaboratively with selected vendor 822. A user may also select reviews 850, in order to read one or more reviews submitted by previous users of the vendor's wedding related services.

If a user selects review 832 or number of reviews 834 from vendor listing 822, or from reviews 850 vendor listing window 844, display 900 of FIG. 9 may be presented. Total review value 902 may be determined by the ratings submitted by other users that have experience with the wedding related services provided by the vendor. Total review value 902 may be based on subcategories of reviews 904, which may include, for example quality of service, responsiveness, professionalism, value for budget, or flexibility, or any other suitable category. Each subcategory or reviews 904 may be based, for example, on a five point scale.

As shown in FIG. 9, reviews 906 may be sorted using drop down menu 908. Reviews 906 may be sorted by date of review, rating, or other suitable categories. As shown in display 900, reviewer on-line identity 910 may be provided with each review, along with date of the reviewer's wedding 912 and number of reviews 914 that the reviewer has written. Date of the review 916 of the vendor's services may be provided, and services used 918 (e.g., photography, etc.) also may be identified. Reviews 906 may contain review text 920, which may provide substantive comments regarding the wedding related services rendered by the vendor.

FIGS. 10-14 illustrate exemplary displays that enable a vendor of wedding related services to build a storefront, market a vendor's business, expand a vendor's network and interact with an on-line community, and manage potential client leads.

System 100 may provide one or more displays to enable vendors of wedding related services to manage contact and delivery of services to clients and/or potential clients. Dashboard display 1000 illustrated in FIG. 10 may provide selections for a vendor to build a storefront 1002, market business 1004, expand network 1006, set matching preferences 1008, or any other suitable selection, or any combination thereof. These selections may also be made from menu bar 1010.

When a vendor selects build storefront 1002, system 100 (shown in FIG. 1) may enable a vendor to specify business or personal information, showcase a portfolio of work, or provide any other suitable information. When a vendor selects market your business 1004, system 100 may enable a vendor to gather reviews, as well as link to or attach such review to a vendor storefront. For example, the number of reviews that vendor has may be used to determine the vendor's position in a vendor catalog. A vendor may also select expand your network 1006, wherein system 100 may connect a vendor with other vendors of wedding related services in a particular geographic area, which may be expanded from local regions to, e.g., national regions. A vendor may search for other vendors in the vendor catalog, or refer vendors with whom a vendor has worked collaboratively. Based on referrals by one vendor to one or more other vendors, system 100 may add links from other vendors to the particular vendor's storefront display. A vendor may also select set preferences 1008, wherein system 100 may enable a vendor to set preferences regarding the category of services that a vendor offers, the pricing of services, or other related service information that may be used by system 100 to link client and services.

Alerts 1012 may indicate when one or more other vendors are attempting to connect with the vendor, e.g., to forge a collaborative relationship to provide services to one or more weddings.

Credits 1014 may indicate how many credits a vendor has earned. Credits may be earned by, for example, referring users to other vendors for wedding related services.

Online tutorial 1016 may be selected to provide an audio presentation, video presentation, audio-visual presentation, or text presentation, or any combination thereof. Online tutorial 1016 may provide information to vendors regarding building a storefront, marketing, expanding a network of vendor contact, or setting match preferences, or any other suitable information, or any combination thereof.

Links 1018 may be provided that are selectable for events 1020, promotions 1022, vendor catalog 1024, community 1026, benefits center 1028, and support center 1030. Selection by a vendor of events 1020 may provide one or more displays with information related to wedding related events (e.g., bridal shows, etc.) within a predefined geographic scope. Selection of promotions 1022 may provide a display with information related to wedding related services promotions by the vendor or by one or more other vendors. Selection of vendor catalog 1024 may provide a list of one or more vendors for one or more categories (e.g., photography, florists, etc.) of wedding services. Selection of community 1026 may provide a vendor with electronic social networking tools to communication with other vendors of wedding related services, as well as with current clients and/or potential clients. Selection of benefits center 1028 may provide one or more displays with information related to membership benefits (e.g., advertising, marketing, or other benefits) for vendors of wedding related services. Selection of support center 1030 by a vendor may enable system 100 to provide one or more displays with information relating to building storefronts, marketing a vendor's wedding related services, communicating with one or more other vendors, setting match preferences, or any other suitable information, or any combination thereof.

System 100 may provide rating logo 1032 to particular vendors of wedding related services. This may be used, for example on a vendor storefront, website, or in search results in order to help prospective clients build confidence in a vendor's services. For example, system 100 may assign rating logo 1032 to a vendor once the vendor has received three or more reviews regarding their services above a particular defined threshold rating.

Figure 10:
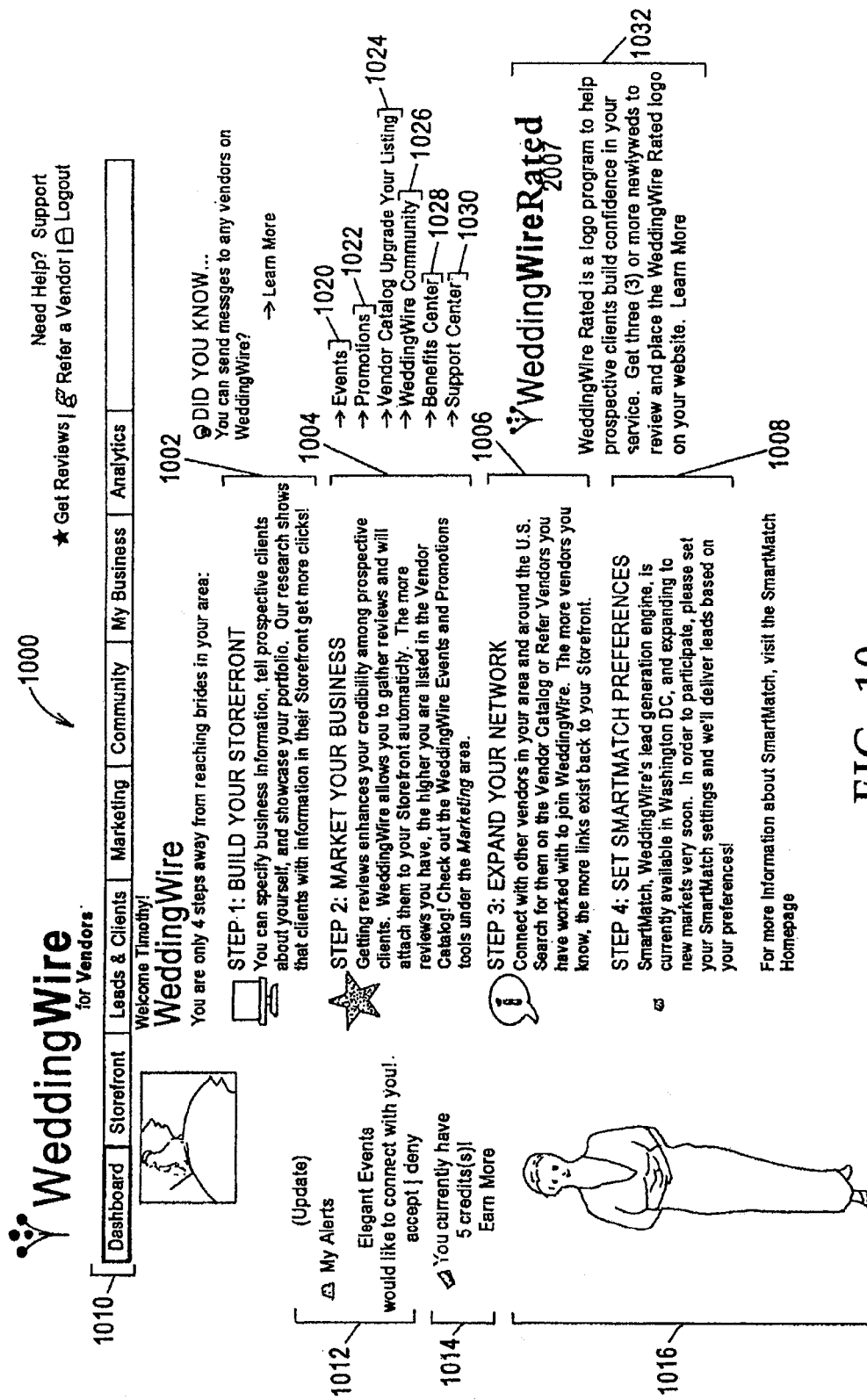

In response to a selection of storefront 1002 in FIG. 10, system 100 may present display 1100, shown in FIG. 11. Exemplary display 1100 may present vendor storefront 1102, which may include contact information 1104 (e.g., telephone number, email address, website address, etc.), ratings and number of reviews information 1106, indication of services 1108 (e.g., photography), any other suitable information, or any combination thereof.

Selection of overview 1110 may provide or enable a vendor to provide "about section" 1112 that may describe the wedding related services offered, experience, awards received, or personal information, or any combination thereof. Business information 1114 may also be entered and/or displayed in storefront display 1100. Business information 1114 may contain date of vendor membership, date vendor's business was established, number of employees, type of payment accepted (e.g., cash, check, major credit cards, etc.), or any other suitable information.

A vendor may provide additional sections to storefront 1102 such as endorsements 1116, promotions 1118, frequently asked questions 1120, tips and advice 1122, or any other suitable sections. Selection of endorsements 1116 may provide a display of endorsements by other wedding related service vendors (e.g., vendors that have worked collaboratively with the vendor on wedding events). Selection of promotions 1118 may provide information on special discounts on services offered by a vendor. Selection of frequently asked questions 1120 may provide a display of questions commonly asked by potential clients of the vendor regarding services or payment, and may provide answers to those questions. Selection of tips and advice 1122 may provide information to prospective clients regarding selection of services, costs to expect, time guidelines, or any other information.

Storefront 1102 may also have "view portfolio" 1124, which, when selected may provide examples of previous work by a vendor. For example, if the vendor is a photographer, a variety of photos taken by the vendor at previous weddings may be displayed such that a potential client is able to gain insight as to the capabilities of a vendor, or the stylistic mediums or preferences of a vendor. Storefront 1102 may also include video introduction 1126, which may be, for example, an audio-visual presentation of information about the vendor's business, examples of the vendor's work, or other advertising information.

Storefront 1102 may also include "vendors I know" section 1128, which may display the names of other vendors of wedding related services that the vendor has worked collaboratively with on other wedding events.

Selection of "leads and clients" from menu bar 1010 of FIG. 10 may present leads and clients display 1200 illustrated in FIG. 12. Leads tab 1202 is illustrated in the leads and clients display 1200. However, a vendor may select clients tab 1204 to display information related to existing clients (e.g., clients with upcoming wedding events or clients that wedding related services were recently provided to, etc.). A vendor may also select availability calendar 1206 to identify which calendar dates have, for example, scheduled meetings with clients or potential clients regarding services, wedding events that the vendor is to provide services on, and which dates are available for a vendor to provide services. A vendor may also select lead templates 1208, which may provide templates of vendor service related information for following a potential client lead.

In the exemplary display 1200 of FIG. 12, leads tab 1202 has been selected, and leads table 1210 is presented. Leads table 1210 may include lead status 1212, lead received information 1214, date and location information 1216, value 1218, expiration date 1220, messages 1222, or any other suitable information, or any combination thereof. Lead status 1212 may indicate whether a lead has been viewed by a vendor (e.g., viewed, not viewed, etc.), whether an estimate has been sent (e.g., sent estimate), or whether a meeting has been scheduled with a potential client. Lead received 1214 may indicated the date and time that a lead was received by system 100 (in FIG. 1) for a vendor. Date and location information 1216 may include the date of the lead or the date of the event, or any other suitable date information, and may indicate the geographic location that the potential client is from, or where the wedding event may take place. Value 1218 may provide the estimated costs or budget that a potential client has for the wedding related service. Expiration date 1220 may indicate when the lead may expire (e.g., based on a selection by a potential client, or based on preferences set by the vendor, or any other suitable criteria, etc.). Messages 1222 may indicate the number of messages between the vendor and potential client regarding wedding related services.

Also, in exemplary display 1200 of FIG. 12, leads table 1210 may be sorted using drop down menu 1224. For example, a vendor may select to sort the lead information in table 1210 by newest leads, expiration date, or by status (not viewed, sent estimate, viewed, meet, etc.), or any other suitable criteria. Once a vendor makes a selection of a search criteria from drop down menu 1224, table 1210 may be updated, such that the information in table 1210 is sorted by the selected sort criteria.

In addition, display 1200 may include inbox 1226, which may indicate the number of new leads received that have not been viewed by the vendor. If a vendor selects inbox 1226, new lead messages from potential clients may be displayed to the vendor in display 1200. If declined leads 1228 is selected, leads that a vendor has declined (e.g., based on vendor availability on a particular date, value of the lead, location, or other particular criteria) may be displayed. Selection of expired leads 1230 may present leads that a vendor or a potential client has not acted on to secure the wedding related services of a vendor. A vendor may desire to view the expired leads to determine if the vendor should follow up with the potential client to determine if they have been able to secure a vendor for the wedding related services, or for any other reason.

Upon selection of marketing tab from menu bar 1010 of FIG. 10, system 100 (FIG. 1) may present display 1300, shown in FIG. 13. Display 1300 may include reviews 1310, which, when selected, may provide a vendor access to information related to obtaining reviews from past clients who have used the vendor's services. The information may, for example, emphasize the importance of obtaining favorable reviews in order to increase credibility and likelihood that couples performing research for wedding related services may consider the utilizing the services of the vendor.

Display 1300 may also include events 1320, which, when selected by a vendor may provide information related to promoting a wedding related services event in a particular geographic area on a specified date or series of dates. A vendor may also select promotions 1330 from display 1300. Upon selection of promotions 1330, a vendor may provide information related to a discount, special offer, or free goods or services in order to promote the vendor's wedding services business. System 100 may notify users who select or consider the services of a vendor that a special promotion is being offered. Display 1300 may enable a vendor to select rating program 1340, which provides information to a vendor related to a program to enable building potential client confidence in a vendor's services. For example the rating program may be based, at least in part, on a predefined number of client reviews greater than or equal to a predefined threshold score.

Upon receiving a selection of community tab from menu bar 1010 of FIG. 10, display 1400 shown in FIG. 14 may present selections such as known vendors 1410, mailbox 1420, answers 1430, discussions 1440, or links 1450, or any other suitable selections. Selecting known vendors 1420 may enable a vendor to communicate and connect with other vendors, such that respective vendors are linked to on their respective storefronts in system 100. Accordingly, system 100 may enable on-line referrals for wedding related services.

A vendor may select mailbox 1420 in display 1400 in order to send and receive messages from other vendors or from potential clients. Upon selection of answers 1430, system 100 may enable a vendor to answer questions submitted by potential clients (e.g., engaged couples, etc.) regarding wedding related services offered. Upon selection of discussions 1440, system 100 may enable a vendor to participate in on-line discussions (e.g., an electronic message board, wherein the board may be subdivided by service categories or topics) with potential clients. Upon selection of links 1450, system 100 may display links to web sites, and may enable commenting and rating of the links.

The detailed description set forth above in connection with the appended drawings is intended as a description of various embodiments and is not intended to represent the only embodiments which may be practiced. The detailed description includes specific details for the purpose of providing a thorough understanding of the embodiments. However, it will be apparent to those skilled in the art that the embodiments may be practiced without these specific details. In some instances, well known structures and components are shown in block diagram form in order to avoid obscuring the concepts of the exemplary embodiments.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The previous description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but is to be accorded the full scope consistent with the language claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for electronically providing, via a communications network, a list having one or more wedding services vendor recommendations, comprising:

receiving from a user input data comprising at least a date of an event and a selection of a first vendor from a first services category;

determining, using a computer processor, one or more wedding related services categories for which the user has not selected a vendor, wherein the determined one or more wedding related services categories do not include the first services category;

determining, based on the received input data, a valid set of vendors from the one or more wedding related services categories that are available for the date of the event; and providing one or more recommended vendors from the valid set of vendors from the one or more wedding related services categories for which the user has not selected a vendor that have availability on the date of the event.

2. The method of claim 1, wherein the received input data further comprises wedding services business name, wedding services vendor type, geographic region data, data indicating the user has already selected a vendor for a wedding related service, data indicating a user is interested in one or more wedding related service vendors, data indicating a recommended final date by which a user is to have selected a wedding related services vendor, data indicating that the user has received information from one or more vendors, data indicating that a user has received pricing information from one or more vendors, or data indicating the user has engaged in electronic communications with one or more vendors, or any combination thereof.

3. The method of claim 1, further comprising determining, with a processor, a score for each respective vendor of the valid set of vendors using input data weighting rules and the received input data, wherein the providing one or more recommended vendors from the valid set of vendors from the one or more wedding related services categories for which the user has not selected a vendor that have availability on the date of the event is based on the respective score for each respective vendor of the valid set of vendors.

4. The method of claim 3, wherein the determining the score for each respective vendor of the valid set of vendors further comprises utilizing vendor rating data, vendor review data, vendor endorsement data, data related to the number of visitors to a vendor website, data related to the number of visitors to a vendor storefront, or data related other vendors of wedding services that a particular vendor has worked in conjunction with, or any combination thereof.

5. The method of claim 4, wherein an increased weighting parameter is assigned to one or more vendors based on the respective review scores received by each vendor, the date the review was provided, or on a response time of a respective vendor responding to a user request, or any combination thereof.

6. The method of claim 3, wherein the determining the score for each respective vendor further comprises determining an estimated success factor of a respective vendor meeting a selected budget received from the user.

7. Non-transitory computer-readable media containing programming instructions for providing a list having one or more wedding services vendor recommendations, that upon execution thereof, causes one or more processors to perform the steps of:
   receiving from a user input data comprising at least a date of an event and a selection of a first vendor from a first services category;
   determining, using a computer processor, one or more wedding related services categories for which the user has not selected a vendor, wherein the determined one or more wedding related services categories do not include the first services category;
   determining, based on the received input data, a valid set of vendors from the one or more wedding related services categories that are available for the date of the event; and
   providing one or more recommended vendors from the valid set of vendors from the one or more wedding related services categories for which the user has not selected a vendor that have availability on the date of the event.

8. The method of claim 1, wherein the received input data further comprises wedding data including at least one of total wedding budget, budget for each type of wedding related service, number of vendors selected by the user to perform wedding related services, one or more names of vendors selected by the user to perform wedding related services, number of vendors that have not been selected by the user to perform wedding related service, or one or more names of vendors that have not been selected by the user to perform wedding related services.

9. The method of claim 8, wherein the determination of the valid set of vendors that are available for the date of the event from the one or more wedding related services categories for which the user has not selected a vendor is based on at least one of the total wedding budget, budget for each type of wedding related service, number of vendors selected by the user to perform wedding related services, one or more names of vendors selected by the user to perform wedding related services, number of vendors that have not been selected by the user to perform wedding related service, or one or more names of vendors that have not been selected by the user to perform wedding related services.

10. The method of claim 1, wherein the received input data further comprises system data including data indicating one or more relationships between one or more vendors of wedding related services, data indicating one or more relationships between one or more brides, or data related to wedding cost trends over a period of time.

11. The method of claim 10, wherein the determination of the valid set of vendors that are available for the date of the event from the one or more wedding related services categories for which the user has not selected a vendor is based on at least one of the one or more relationships between one or more of the vendors, data indicating one or more relationships between one or more users, or data related to wedding cost trends over a period of time.

12. The method of claim 1, wherein the received input data further comprises external data including vendor website data, number of visitors to a vendor website, or review data for one or more vendors presented on one or more websites.

13. The method of claim 12, wherein the determination of the valid set of vendors that are available for the date of the event from the one or more wedding related services categories for which the user has not selected a vendor is based on at least one of the vendor website data, the number of visitors to the vendor website, or the review data for the one or more vendors presented on one or more websites.

14. The method of claim 3, wherein the determining the score for each respective vendor of the valid set of vendors further comprises determining if user budget data of the received input data corresponds to a respective vendor's pricing data.

15. The non-transitory computer readable media of claim 7, further comprising the step of determining, with one or more processors, a score for each respective vendor of the valid set of vendors using input data weighting rules and the received input data, wherein the providing the one or more recommended vendors from the valid set of vendors from the one or more wedding related services categories for which the user has not selected a vendor that have availability on the date of the event is based on the respective score for each respective vendor of the valid set of vendors.

16. The non-transitory computer readable media of claim 7, wherein the received input data further comprises wherein the received input data further comprises wedding data including at least one of total wedding budget, budget for each type of wedding related service, number of vendors selected by the user to perform wedding related services, one or more names of vendors selected by the user to perform wedding related services, number of vendors that have not been selected by the user to perform wedding related service, or one or more names of vendors that have not been selected by the user to perform wedding related services.

17. The non-transitory computer readable media of claim 16, wherein the determination of the valid set of vendors that are available for the date of the event from the one or more wedding related services categories for which the user has not selected a vendor is based on at least one of the total wedding budget, budget for each type of wedding related service, number of vendors selected by the user to perform wedding related services, one or more names of vendors selected by the user to perform wedding related services, number of vendors that have not been selected by the user to perform wedding related service, or one or more names of vendors that have not been selected by the user to perform wedding related services.

18. The non-transitory computer readable media of claim 7, wherein the received input data further comprises system data including data indicating one or more relationships between one or more vendors of wedding related services, data indicating one or more relationships between one or more brides, or data related to wedding cost trends over a period of time.

19. The non-transitory computer readable media of claim 18, wherein the determination of the valid set of vendors that are available for the date of the event from the one or more wedding related services categories for which the user has not selected a vendor is based on at least one of the one or more relationships between one or more of the vendors, data indicating one or more relationships between one or more users, or data related to wedding cost trends over a period of time.

20. The non-transitory computer readable media of claim 7, wherein the received input data further comprises external data including vendor website data, number of visitors to a vendor website, or review data for one or more vendors presented on one or more websites.

21. The non-transitory computer readable media of claim 20, wherein the determination of the valid set of vendors that are available for the date of the event from the one or more wedding related services categories for which the user has not selected a vendor is based on at least one of the vendor website data, the number of visitors to the vendor website, or the review data for the one or more vendors presented on one or more websites.

* * * * *